(12) United States Patent
Hora et al.

(10) Patent No.: US 7,454,373 B2
(45) Date of Patent: Nov. 18, 2008

(54) SYSTEM AND METHOD FOR PROVIDING AUTOMATED DATABASE ASSISTANCE TO FINANCIAL SERVICE OPERATORS

(75) Inventors: Rajesh Hora, Dublin, OH (US); Lisa Marie Dommer, Reynoldsburg, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 1530 days.

(21) Appl. No.: 10/136,360

(22) Filed: May 2, 2002

(65) Prior Publication Data

US 2002/0152288 A1 Oct. 17, 2002

Related U.S. Application Data

(63) Continuation-in-part of application No. 09/705,812, filed on Nov. 6, 2000, now abandoned.

(51) Int. Cl.
*G06Q 40/00* (2006.01)
(52) U.S. Cl. .............................. 705/35; 705/1
(58) Field of Classification Search .............. 705/1, 705/35
See application file for complete search history.

(56) References Cited

U.S. PATENT DOCUMENTS

| | | | |
|---|---|---|---|
| 3,938,091 A | 2/1976 | Liu | |
| 4,321,672 A | 3/1982 | Thomson | |
| 4,396,985 A | 8/1983 | Ohara | |
| 4,567,359 A | 1/1986 | Lockwood | |
| 4,633,397 A | 12/1986 | Macco | |
| 4,672,377 A | 6/1987 | Murphy | |
| 4,695,880 A | 9/1987 | Johnson | |
| 4,700,055 A | 10/1987 | Kashkashian | |
| 4,713,761 A | 12/1987 | Sharpe | |
| 4,725,719 A | 2/1988 | Roach | |
| 4,797,913 A | 1/1989 | Kaplan | |
| 4,799,156 A | 1/1989 | Shavit | |
| 4,812,628 A | 3/1989 | Boston | |
| 4,823,264 A | 4/1989 | Deming | |
| 4,882,675 A | 11/1989 | Nichtberger | |
| 4,964,043 A | 10/1990 | Galvin | |
| 4,988,849 A | 1/1991 | Sasaki | |
| 4,992,940 A | 2/1991 | Dworkin | |
| 5,023,904 A | 6/1991 | Kaplan | |

(Continued)

OTHER PUBLICATIONS

New Java Based Collaborative Application Being Developed by OLDE Discount Stockbrokers, PR Newswire , Jun. 23, 1998.*

(Continued)

*Primary Examiner*—Jagdish N Patel
(74) *Attorney, Agent, or Firm*—Hunton & Williams LLP

(57) ABSTRACT

A financial customer support system provides an integrated gateway to a service operator fielding financial service calls via a call center or other facility. Service attendants taking calls via an automatic call distributor or other channels have access to a workstation communicating with the transaction server, which in turn has access to multiple information sources for mutual fund families, tax and other information. Because the attendants at the call center or other service site need not resort to printed information or need to correlate information from multiple sources, responsiveness is increased and quality of information is improved. Different levels or hierarchies may be clicked through or accessed according to particular client requests.

29 Claims, 5 Drawing Sheets

U.S. PATENT DOCUMENTS

| | | |
|---|---|---|
| 5,050,207 A | 9/1991 | Hitchcock |
| 5,053,607 A | 10/1991 | Carlson |
| 5,054,096 A | 10/1991 | Beizer |
| 5,084,816 A | 1/1992 | Boese |
| 5,111,395 A | 5/1992 | Smith |
| 5,157,717 A | 10/1992 | Hitchcock |
| 5,175,682 A | 12/1992 | Higashiyama |
| 5,220,501 A | 6/1993 | Lawlor |
| 5,225,978 A | 7/1993 | Peterson |
| 5,237,159 A | 8/1993 | Stephens |
| 5,237,620 A | 8/1993 | Deaton |
| 5,265,033 A | 11/1993 | Vajk |
| 5,283,829 A | 2/1994 | Anderson |
| 5,287,269 A | 2/1994 | Dorrough |
| 5,311,594 A | 5/1994 | Penzias |
| 5,321,841 A | 6/1994 | East |
| 5,336,870 A | 8/1994 | Hughes |
| 5,350,906 A | 9/1994 | Brody |
| 5,351,186 A | 9/1994 | Bullock |
| 5,367,581 A | 11/1994 | Abel |
| 5,373,550 A | 12/1994 | Campbell |
| 5,396,417 A | 3/1995 | Burks |
| 5,402,474 A | 3/1995 | Miller |
| 5,412,190 A | 5/1995 | Kopesec |
| 5,420,405 A | 5/1995 | Chasek |
| 5,424,938 A | 6/1995 | Wagner |
| 5,446,740 A | 8/1995 | Yien |
| 5,450,537 A | 9/1995 | Hirai |
| 5,465,206 A | 11/1995 | Hilt |
| 5,473,143 A | 12/1995 | Vak |
| 5,473,732 A | 12/1995 | Change |
| 5,479,494 A | 12/1995 | Clitherow |
| 5,479,532 A | 12/1995 | Abel |
| 5,483,445 A | 1/1996 | Pickering |
| 5,484,988 A | 1/1996 | Hills |
| 5,485,370 A | 1/1996 | Naylor |
| 5,504,677 A | 4/1996 | Pollin |
| 5,511,117 A | 4/1996 | Zazzera |
| 5,513,250 A | 4/1996 | McAllister |
| 5,532,920 A | 7/1996 | Hartrick |
| 5,537,314 A | 7/1996 | Kanter |
| 5,537,473 A | 7/1996 | Kaku |
| 5,544,040 A | 8/1996 | Gerbaulet |
| 5,544,086 A | 8/1996 | Davis |
| 5,550,734 A | 8/1996 | Tater |
| 5,551,021 A | 8/1996 | Harada |
| 5,557,518 A | 9/1996 | Rosen |
| 5,566,330 A | 10/1996 | Sheffield |
| 5,568,489 A | 10/1996 | Yien |
| 5,570,465 A | 10/1996 | Tsakanikas |
| 5,583,759 A | 12/1996 | Geer |
| 5,590,197 A | 12/1996 | Chen |
| 5,592,378 A | 1/1997 | Cameron |
| 5,592,560 A | 1/1997 | Deaton |
| 5,594,837 A | 1/1997 | Noyes |
| 5,598,557 A | 1/1997 | Doner |
| 5,606,496 A | 2/1997 | D'Agostino |
| 5,621,201 A | 4/1997 | Langhans |
| 5,621,789 A | 4/1997 | McCalmont |
| 5,621,812 A | 4/1997 | Deaton |
| 5,625,767 A | 4/1997 | Bartell |
| 5,634,101 A | 5/1997 | Blau |
| 5,644,493 A | 7/1997 | Motai |
| 5,649,117 A | 7/1997 | Landry |
| 5,652,786 A | 7/1997 | Rogers |
| 5,653,914 A | 8/1997 | Gruener |
| 5,657,383 A | 8/1997 | Gerber |
| 5,659,165 A | 8/1997 | Jennings |
| 5,664,115 A | 9/1997 | Fraser |
| 5,684,870 A | 11/1997 | Maloney |
| 5,710,887 A | 1/1998 | Chelliah |
| 5,710,889 A | 1/1998 | Clark |
| 5,727,163 A | 3/1998 | Bezos |
| 5,740,231 A | 4/1998 | Cohn |
| 5,754,840 A | 5/1998 | Rivette |
| 5,758,328 A | 5/1998 | Giovannoli |
| 5,761,647 A | 6/1998 | Boushy |
| 5,761,661 A | 6/1998 | Coussenns |
| 5,774,122 A | 6/1998 | Kojima |
| 5,778,178 A | 7/1998 | Arunachalam |
| 5,790,650 A | 8/1998 | Dunn |
| 5,793,861 A | 8/1998 | Haigh |
| 5,794,221 A | 8/1998 | Egendorf |
| 5,802,498 A | 9/1998 | Comesanas |
| 5,802,502 A | 9/1998 | Gell |
| 5,815,683 A | 9/1998 | Vogler |
| 5,819,092 A | 10/1998 | Ferguson |
| 5,819,285 A | 10/1998 | Damico |
| 5,826,241 A | 10/1998 | Stein |
| 5,826,245 A | 10/1998 | Sandberg-Diment |
| 5,826,250 A | 10/1998 | Trefler |
| 5,832,476 A | 11/1998 | Tada |
| 5,835,580 A | 11/1998 | Fraser |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West |
| 5,847,709 A | 12/1998 | Card |
| 5,848,427 A | 12/1998 | Hyodo |
| 5,862,223 A | 1/1999 | Walker |
| 5,864,871 A * | 1/1999 | Kitain et al. ............. 707/104.1 |
| 5,870,456 A | 2/1999 | Rogers |
| 5,870,724 A | 2/1999 | Lawlor |
| 5,873,072 A | 2/1999 | Kight |
| 5,884,032 A | 3/1999 | Bateman |
| 5,884,288 A | 3/1999 | Chang |
| 5,889,863 A | 3/1999 | Weber |
| 5,903,881 A | 5/1999 | Schrader |
| 5,918,214 A | 6/1999 | Perkowski |
| 5,918,217 A | 6/1999 | Maggioncalda |
| 5,926,812 A | 7/1999 | Hilsenrath |
| 5,933,816 A | 8/1999 | Zeanah |
| 5,933,823 A | 8/1999 | Cullen |
| 5,933,827 A | 8/1999 | Cole |
| 5,940,812 A | 8/1999 | Tengel |
| 5,940,843 A * | 8/1999 | Zucknovich et al. ........ 715/516 |
| 5,952,641 A | 9/1999 | Korshun |
| 5,963,953 A | 10/1999 | Cram |
| 5,970,482 A | 10/1999 | Pham |
| 5,982,370 A | 11/1999 | Kamper |
| 5,991,780 A | 11/1999 | Rivette |
| 5,995,948 A | 11/1999 | Whitford |
| 5,999,907 A | 12/1999 | Donner |
| 6,018,714 A | 1/2000 | Risen |
| 6,912,529 B1 * | 6/2005 | Kolfman ...................... 707/10 |
| 7,197,470 B1 * | 3/2007 | Arnett et al. .................. 705/10 |
| 2001/0018739 A1 | 8/2001 | Anderson et al. |
| 2001/0037309 A1 | 11/2001 | Vrain |

OTHER PUBLICATIONS

The one-stop research shop has finally arrived—Online distribution of data will mean that reports go to the right people, writes Geoffrey Nairn, Financial News, May 8, 2000.*

Retkwa, Rosalyn; "Jazzy Tech Tools", Registered Representative, Feb. 2000.*

Myers, Randy. The wired world of investment information, Nation's Business. Washington: Mar. 1997. vol. 85, Iss. 3; p. 58 (3 pages).* eCharge, eCharge Corporation, www.echarge.com, Dec. 3, 1999.

Tracy Pletz et al., Summary of the at your risk architecture, Jun. 3, 1999.

Siebel, Siebel: Ensuring Customer Success, www.siebel.com, Nov. 17, 1999.

OMG, Welcome to OMG's CORBA for Beginners Page!, www.omg.com, May 25, 1999.
Sun MicroSystems, Inc., Schema for Representing CORBA Objects in an LDAP directory, May 21, 1999.
OMG, Library, www.omg.com, May 25, 1999.
OMG, What is CORBA?, , www.omg.com, May 25, 1999.
Overview of CORBA, , www.omg.com, May 25, 1999.
Java, Java™ Technology in the Real World, java.sun.com, May 21, 1999.
Java, Java™ Servlet API, java.sun.com, May 21, 1999.
Java, Staying in Touch with JNDI, java.sun.com, May 21, 1999.
Java, Java™ Remote Method Invocation (RMI) Interface, java.sun.com, May 21, 1999.
Java, Banking on Java™ Technology, java.sun.com, May 21, 1999.
Java, The JDBC™ Data Access API, java.sun.com, May 21, 1999.
Anne Thomas, Enterprise Javabeans™ Technology: Server Component Model for the Java™ platform, java.sun.com, May 21, 1999.
S. R. Hiremath, Numerical Credit Scoring Model, Operations Research Bulletin, WA13.16, Apr. 30, 1975.
Reuters, Getting Smart with Java: Sun Micro Says American Express to Use Java for Smart Card, www.abcnew.go.com/sciences/tech, Jun. 6, 2000.
David Bank, Cash, Check, Charge—What's Next?, Seattle Times, Mar. 6, 1998.
Gerry Vandenengel, Cardson the Internet: Advertising on a $3 Bill, Industry Intelligence, Feb. 1, 1995.
Kim A. Strassel, Dutch Software Concern Experiments with Electronic 'Cash' in Cyberspace, Wall Street Journal, Apr. 17, 1995.
Jeffrey Kutler, Cash Card Creator Looking Beyond Mondex, Feb. 9, 1995.
David Post, E-Cash: Can't Live With It, Can't Live Without It, The American Lawyer, pp. 116-117, Mar. 1, 1996.
Russell Mitchell, Cyberspace: Crafting Software . . . , Business Week, pp. 78-86, Feb. 27, 1995.
Jeffrey Kutler, A Different Drummer on the Data Highway, American Banker, May 12, 1995.
Stephen Eppmt, A pLayer Goes After Big Bucks in Cyberspace, American Banker, May 5, 1995.
Robert Barnham, Network Brings Together Producers and Companies, Bests Review Feb. 1, 1994.
Vanessa Houlder, OFT Gives the Individual Top Priority: Report Calls for Deregulation of Business Lending, The Financial Times, Jun. 8, 1994.
Kennedy Maiz, Fannie Mae on the Web, Newsbyte, May 8, 1995.
Anne Knowles, Improved Internet Security Enabling On-Line Commerce, PC Week, Mar. 20, 1995.
Aversion Therapy: Banks Overcoming Fear of the Net to Develop Safe Internet-based Payment System w/ Netscape Communicator, Network World, Dec. 12, 1994.
Don Clark, Microsoft, Visa to Jointly Develop PC Electronic-Shopping Software, Wall Street Journal, The, B9 Nov. 9, 1994.
Understanding Product Data Management, Hewlett-Packard Company, Apr. 26, 1999.
Getting Started: Specific GE TPN Post Service Use Guidelines, GE, Apr. 26, 1999.
Resource Center: Consolidated Edison Selects GE TPN Post, GE, Apr. 26, 1999.
ThomasNet, Thomas Publishing Company, Apr. 26, 1999.
SoluSource: For Engineers By Engineers, Thomas Publishing Company, Apr. 26, 1999.
Harris InfoSource, Apr. 26, 1999.
Welcome to MUSE, MUSE Technologies, Apr. 26, 1999.
Product Data Integration Technologies, Inc., PDIT, Apr. 26, 1999.
SBA: Pro-Net, SBA, Apr. 1, 1999.
FreeMarkets, FreeMarkets Online, Inc., Apr. 26, 1999.
Associates National Bank (DE) Credit Card Services, The Associates, www.theassocitheassociates.atescomcorn/consumer/credit_cards/rnain.html, Apr. 6, 1999.
At Your Request, Wingspanbankcom, Sep. 28, 1999.
Robyn Meredith, Internet bank moves closer to virtual reality, USA Today, May 5, 1995.
Marvin Sirbu and J.D. Tygar, NetBill: An Internet Commerce System Optimized for Network Delivered Services, http://www.ini.cmu.edu:80/netbill, pp. 1-12, Feb. 27, 1995.
The check is in the email., Information Today, vol. 12, No. 3, Mar. 1, 1995, ISSN: 8755-6286.
The Gale Group, G&D America's Multi-application Smart Card Selected for Combined Payroll and 'Virtual Banking' Program in Mexico, wysiwyg://0/http://www.dialogclassic.com/history, Business Wire, Apr. 24, 1998, p. 4241047.
Richard Mitchell, Netlink Goes After An Unbanked Niche, wysiwyg://0/http://www.dialogclassic.com/history, ISSN: 1093-1279, Sep. 1999.

* cited by examiner

SYSTEM AND METHOD FOR PROVIDING AUTOMATED DATABASE ASSISTANCE TO FINANCIAL SERVICE OPERATORS

CROSS REFERENCE TO RELATED APPLICATIONS

This application is a continuation-in-part of U.S. patent application Ser. No. 09/705,812 filed Nov. 6, 2000 now abandoned, the disclosure of which is incorporated herein by reference.

FIELD OF THE INVENTION

The present invention relates generally to on-line systems for providing information to users. More particularly, the present invention relates to a comprehensive interactive system and method for providing information to financial service operators in response to received customer service inquiries.

BACKGROUND OF THE INVENTION

In recent years, the size and liquidity of the financial and capital markets has increased in response to governmental deregulation and other contributing factors. Consequently, services traditionally performed by disparate organizations such as mutual fund services, conventional brokerage services, retirement accounts, etc. are now commonly being offered and managed by a single organization. Further, the parallel development of the Internet and other forms of electronic communication have substantially increased the speed in which organizations must provide customer service and information requests. Because of these increasing demands, the support infrastructure of such organizations has struggled to provide prompt and accurate customer service information.

For example, a conventional financial services customer support system typically includes a toll-free telephone number which customers or potential customers may call to obtain specific or general information about their account or potential account. In response to a call, a customer service representative (CSR) would attempt to retrieve the requested information in real-time while the user waits on the line. The information with which the CSR has access to typically includes a combination of computer-based information as well as hard-copy information. Unfortunately, as the number of services offered by an organization increases, the ability for a CSR to accurately and quickly obtain the relevant information decreases, leading to increased call hold times and degraded customer service metrics and satisfaction. Because of the lack of a comprehensive and easily navigable source for all relevant information, the CSR must marry a myriad of information sources on-the-fly in providing accurate information to the caller.

Taking just the specific single case of mutual fund services, accessing and relating any one of the multiple categories of information which a customer or potential customer may inquire about is particularly difficult, let alone in real-time. Mutual funds information alone typically includes a vast spectrum of information, such as the investment fund type; its class, its yield, return, dividend, and cost information; a breakdown of the constituent equities making up the fund and their respective percentages; the particular fund's redemption policies; state and federal tax information; etc. Further, any given financial services organization may offer thousands of different mutual funds. This renders the task presented to CSR's in conventional systems increasingly difficult.

Therefore, there exists a need in the art of financial services information systems for a comprehensive method and system for providing financial service information to CSR's in substantially real-time.

SUMMARY OF THE INVENTION

The present invention overcomes the problems noted above, and provides additional advantages, by providing a comprehensive interactive system and method for providing automated database assistance to financial service operators, in which a transaction server containing an interface to multiple sources of information supports a customer service representative staffing a call center or other operation. Because a variety of information sources are collected and gated via one access resource, it is no longer necessary for service operators to search for the location of data that a customer may request. Furthermore, since interfaces may be provided to multiple data sources, a range of queries may be carried out against that financial and other information to satisfy customer requests. Call latency is reduced, efficiency is increased, and the quality and responsiveness of information available to customers is improved.

BRIEF DESCRIPTION OF THE DRAWINGS

The present invention can be understood more completely by reading the following Detailed Description of exemplary embodiments, in conjunction with the accompanying drawings, in which.

DETAILED DESCRIPTION OF THE PREFERRED EMBODIMENTS

Figure 1:
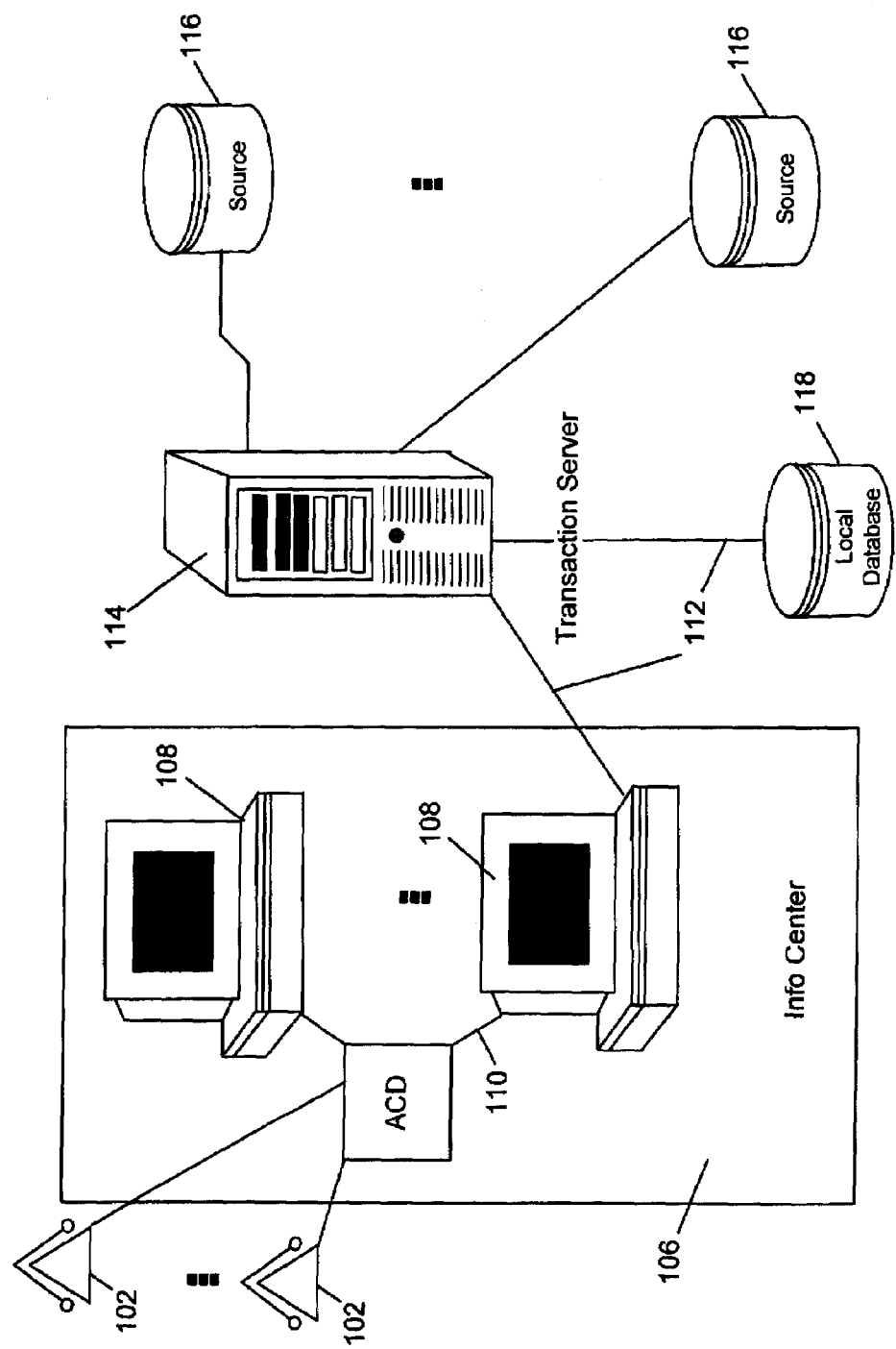
FIG. 1 is a block diagram of a computer network suitable for implementing a method and system according to the present invention.

A system architecture 100 in accordance with one embodiment of the present invention is generally illustrated in FIG. 1. One or more existing or potential customers 102 are connected over a communications link 104 to an information center 106. The communications link may be a telecommunications link such as a conventional or wireless telephone system or may also include a computer network such as the Internet. The information center 106 may include a call center operation including an automatic call distributor (ACD) which receives incoming customer communications over the communications link 104 for distribution to one or more customer service representative (CRS) workstations 108 over a communication link 110.

In one embodiment, the CSR workstations 108 each execute a client browser application that supports the HTTP protocol, and is connected typically through a network service provider to a suitable computer network 112 such as a local area network (LAN).

CSR workstation 108 may include, for instance, a personal computer running the Microsoft Windows™ 95, 98, Millenium™, NT™, 2000, or XP™, Windows™CE™, PalmOS™, Unix, Linux, Solaris™, OS/2™, BeOS™, MacOS™ or other operating system or platform. CSR workstation 108 may also include a microprocessor such as an Intel x86-based device, a Motorola 68K or PowerPC™ device, a MIPS, Hewlett-Packard Precision™, or Digital Equipment Corp. Alpha™ RISC processor, a microcontroller or other general or special purpose device operating under programmed control. Furthermore, client computer system 102 may include electronic memory such as RAM (random access memory) or EPROM (electronically programmable read only memory), storage devices such as a hard drive, CDROM or rewritable CDROM or other magnetic, optical or other media, and other associated components connected over an electronic bus, as will be appreciated by persons skilled in the art. CSR workstation 108 may also include a network-enabled appliance such as a WebTV™ unit, radio-enabled Palm™ Pilot or similar unit, a set-top box, a networkable game-playing console such as Sony Playstation™, Sega Dreamcast™, Microsoft X-Box™, or Nintendo Gamecube™, a browser-equipped cellular telephone, or other TCP/IP client or other device.

In addition to a LAN, suitable computer networks may also include or interface with any one or more of, for instance, the Internet, an local intranet, a PAN (Personal Area Network), a WAN (Wide Area Network), a MAN (Metropolitan Area Network), a storage area network (SAN), a virtual private network (VPN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34 bis analog modem connection, a cable modem, an ATM (Asynchronous Transfer Mode) connection, or an FDDI (Fiber Distributed Data Interface) or CDDI (Copper Distributed Data Interface) connection. Furthermore, computer network 112 may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. Computer network 112 may yet further include or interface with any one or more of an RS-232 serial connection, an IEEE-1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection.

A transaction server system 114 is also coupled typically through an network service provider to the network 112. The transaction server system 114 may be or include, for instance, a workstation running the Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform. The transaction server system 114, executes at least one web server application conventionally known as a HTTPd server. In addition, the server computer system 114 preferably provides communication with a plurality of storage devices including at least one, and preferably many, information sources 116 for storing, generating, and communicating many types of information such as equity information, debt instrument information, tax information, etc. Information sources 116 may include, for example, the commercial Lipper™, Bisys™, MorningStar™, Performance Group™, Research Group™, or other database, on-line or other sources of financial or other information.

In addition to information sources 116, the transaction server system 114 preferably also includes or communicates with at least one local storage system 118, for storing at least one, though typically many, web pages as well as intermediate search results, user information, etc. Also, transaction server system 114 may include several individual server computers positioned at various locations on the network 112.

In operation, the CSR workstation 108 requests a web page by issuing a URL request through the network 112 to the transaction server system 114. A URL consistent with the present invention may be a simple URL of the form:

<protocol_identifier>://<server_path>/<web_page_path>

A "protocol_identifier" of "http" specifies the conventional hyper-text transfer protocol. A URL request for a secure network communication session typically utilizes the secure protocol identifier "https," assuming that the client browser and web server each support and implement the secure sockets layer (SSL). The "server_path" is typically of the form "prefix.domain," where the prefix is typically "www" to designate a web server and the "domain" is the standard Internet sub-domain.top-level-domain of the transaction server system 114. The optional "web_page_path" is provided to specifically identify a particular hyper-text page maintained by the web server.

In response to a received URL identifying an existing web page, the transaction server system 114 returns the web page, subject to the HTTP protocol, to the CSR workstation 108. This web page typically incorporates both textural and graphical information including embedded hyper-text links, commonly referred to as hyperlinks, that permit the CSR to readily select a next URL for issuance to the network 112.

The URL issued from the CSR workstation 108 may also be of a complex form that identifies a common gateway interface (CGI) program on the transaction server system 114. Such a HTML hyperlink reference is typically of the form:

<form action="http://www.vendor.com/cgi-bin/logon-.cgi" method=post>

A hyper-text link of this form directs the execution of the logon.cgi program or script on an HTTP server in response to a client-side selection of the hyperlink. A logon form supported by a logon CGI program is typically used to obtain a CSR login name and password to initiate an authenticated session between the browser application and the web server for purposes of supporting, for example, a secure communications session.

Figure 2:
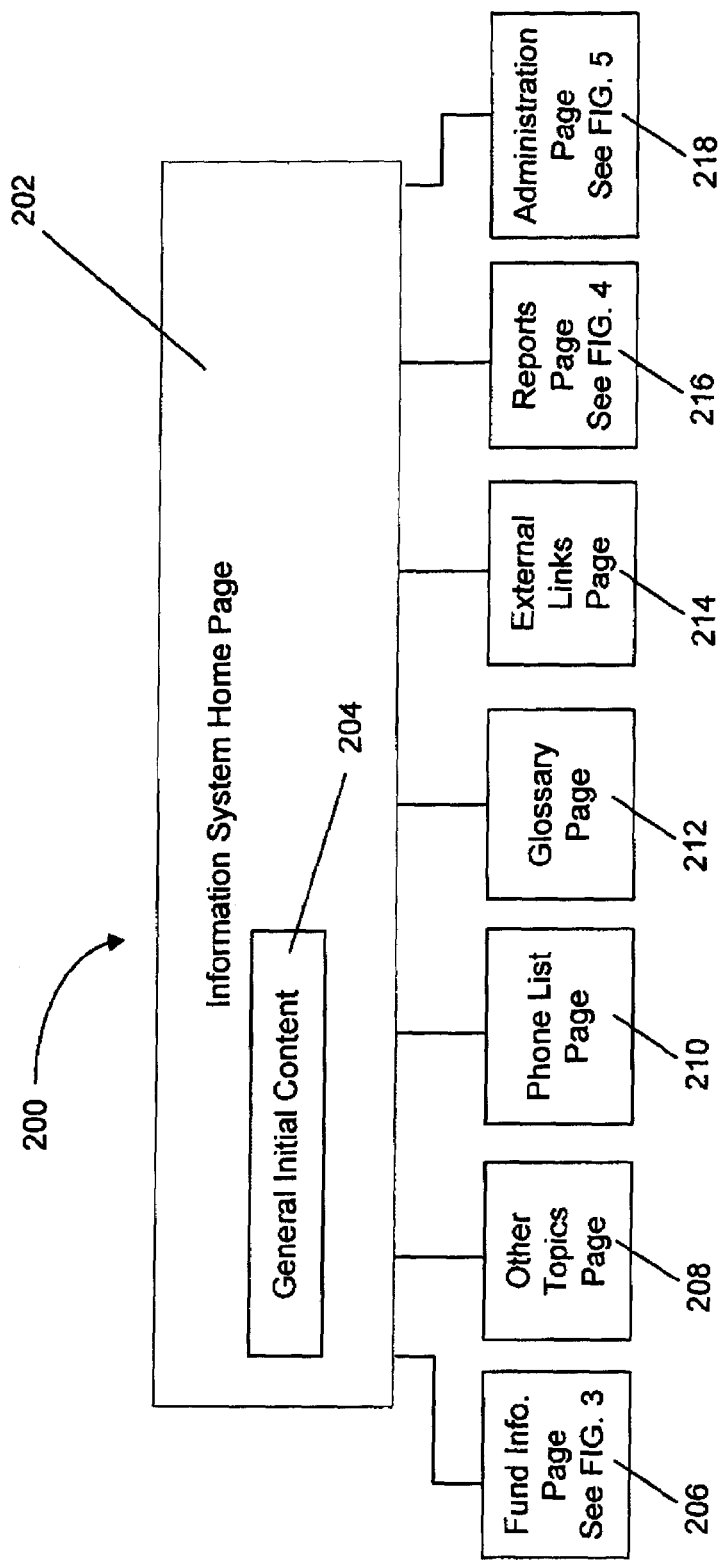
FIG. 2 is a flow chart describing one embodiment of a method for determining and presenting a learning curriculum over the network of FIG. 1.

Referring now to FIG. 2, there is illustrated an organizational chart describing one preferred embodiment of a system 200 for providing automated assistance to financial service CSR's over a computer network. The system of the present invention revolves around the exchange and availability of information over a computer network and can be implemented by a software program resident on one or more network servers associated with the supplier and hosting a plurality of web pages. The starting point for the system 200 is an information system home page 202. The information system home page 202 is hosted by a network server which provides the platform and initial user interface upon which the system 200 is based. As described above, remote users of the system 200 navigate to the information system home page 202 from remote devices operatively connected to the network by launching their individual client browser applications (e.g., Microsoft Internet Explorer™ and Netscape Navigator®) and typing in the URL associated with the home page 202.

In a preferred embodiment of the present system, users must first authenticate themselves with the network server prior to reaching the information system home page 202. As is known in the art, authentication may take many forms including submission of a unique username/password combination suitable for identifying the user to the server. Additionally, network "cookies" may be used to store authentication information on the user's individual client computer system. In a manner known in the art, upon submission of the information system home page URL into the client browser application, the network server reads the client's "cookie" and obtains the necessary authentication information. Although several methods have been disclosed, it should be understood that any suitable method for authenticating a user to a network server may be used with the present invention.

In one embodiment of an information system home page 202, selective initial content, generally referred to by the numeral 204, is displayed directly on the home page for the user to review without requiring user selection of a particular content category or fund information. This initial content is preferably of the general type and may include software functionality news, general fund news, financial news, as well as brief information concerning the current state of the various global financial markets. Additionally, each element of general information may also include a hyperlink, whereupon selection thereof by the user will result in the display of more detailed content relating to the selected general information element.

In addition to the general initial content 204, the information system home page 202 also provides a fund search option for receiving a CSR's request for information concerning a specific fund. In one embodiment, the fund search option includes a text entry box into which the user enters keyword (s) associated with a particular. In one embodiment, users may search for funds using a variety of identification elements such as name, CUSIP number, ticker symbol, and TA#. Alternatively, the option may include a drop-down menu including a listing of all funds available for review. Upon receiving a submission from the user for a particular fund, the system displays a 'Fund Information' page 206 corresponding to the user's selection. As will be set forth in additional detail below in FIG. 3, one embodiment of the 'Fund Information' page 206 includes a plurality of easily navigable and detailed information regarding the selected fund. In this manner, the CSR is able to quickly locate and retrieve any kind of fund information and disseminate the information to the waiting customer.

The information system home page 202 also preferably includes a plurality of hyperlinks for directing the user to additional discrete content areas of the system. In particular, a link is preferably provided which directs users to an 'Other Topics' page 208 including information relating to general product information, broker/dealer information, historical tables and other information. Another link on home page 202 directs users to a 'Phone List' page 210 wherein contact information for a variety of financial service personnel are listed in a searchable and sortable manner. Preferably, personnel contact information includes: employee information, work address information, and home address information. In particular, the employee information includes information regarding each salesperson's: territory; wholesaler type; internal wholesaler; 800extension; and internal extension.

Home page 202 also includes a link for directing users to a 'Glossary' page 212 including definitions and descriptions for a plurality of financial terms and acronyms. Similarly, a link is provided for directing users to an 'External Links' page 214 which includes a listing of external hyperlinks directing users to relevant information useable in meeting the needs of customers. In addition to the above links, a link is provided on home page 202 for directing users to a 'Reports' page 216 wherein users may generate and display a plurality of reports designed to assist the CSR in reviewing the various elements of fund information. In a preferred embodiment, the 'Reports' page 216 enables users to generate both html-based reports viewable in the client browser application as well reports based upon other document types viewable in external or otherwise integrated software applications, such as Excel spreadsheet software by Microsoft Corporation. The features and capabilities of the 'Reports' page 216 will be set forth in additional detail below with respect to FIG. 4.

In order to facilitate modifications and other administration of the various components of the financial services information system, a link on home page 202 is provided for directing users to an 'Administration' page 218. Preferably, access to the 'Administration' page 218 is restricted to authorized system administrators. By using a logon script or other suitable means, the system prevents unauthorized users from modifying the content or organization of the various system elements. As will be set forth in addition detail below in FIG. 5, one embodiment of the 'Administration' page 218 includes several administrator-selectable options which permit modification of the site content.

In one embodiment of the present system, the information described above in relation to the information system home page 202 is provided in a frame interface which, as is well known in the art, operates to form a consistent border around changing content portions of the page. In this manner, options available from home page 202 are also available to the user at any time during the navigation of the system. By providing certain core options in a frame, users are not required to navigate back to the system home page to make one of these selections. Since not all client browsers support the use of frames in presenting web pages, this presentation manner may be optional.

Figure 3:
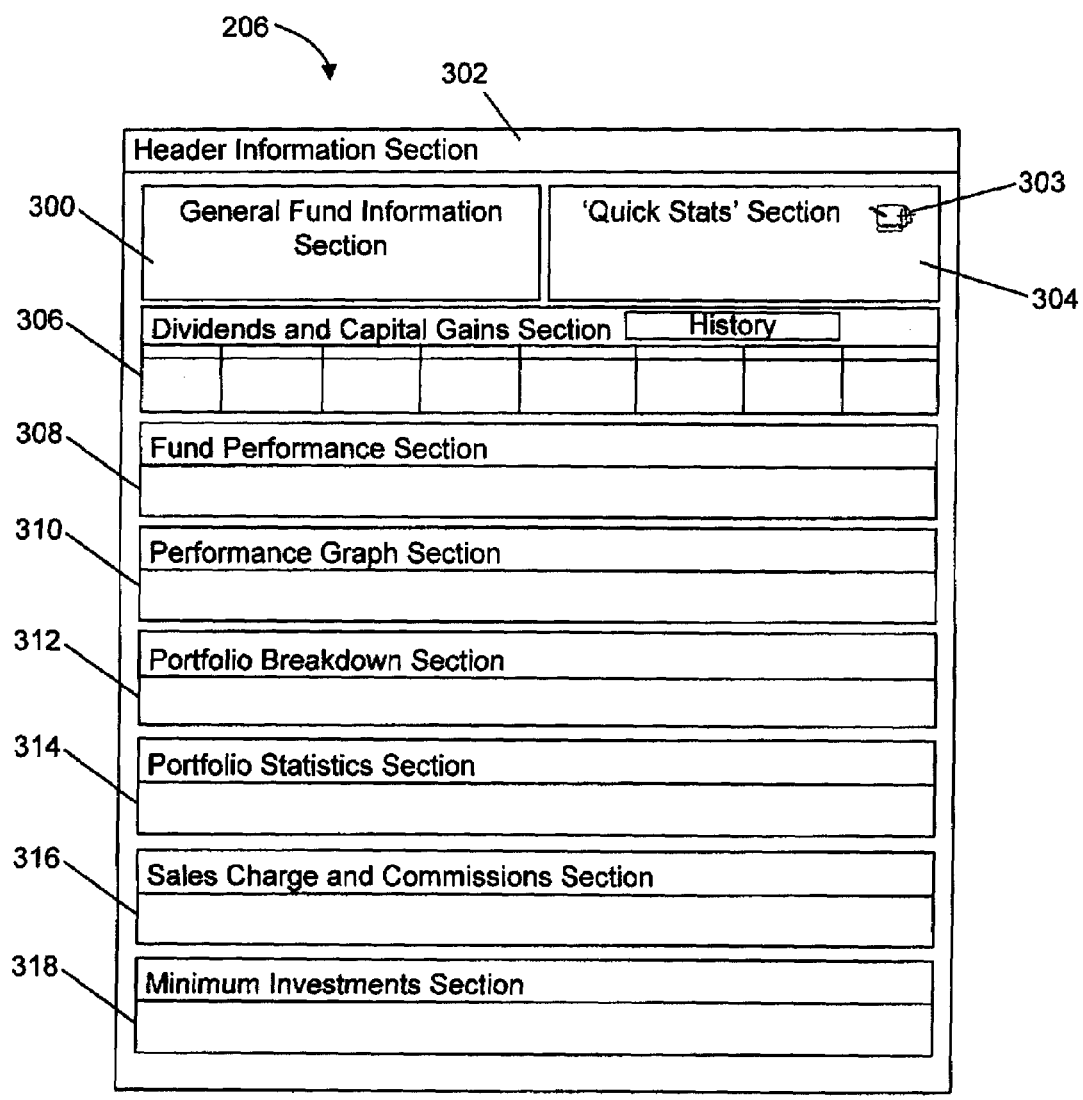
FIG. 3 is a flow chart describing one embodiment of a method for registering with the education system.

Referring now to FIG. 3, there is shown an organizational map of one embodiment of the 'Fund Information' page 206 described briefly above. As mentioned previously, the 'Fund Information' page 206 is designed to provide users with access to a wealth of detailed information about the selected fund. Accordingly, several forms of information available about the selected fund are preferably displayed on linked pages selectable from the 'Fund Information' page 206. These linked pages will be defined in further detail below. Further, in an effort to assist users in utilizing the available information, various term definitions will be provided in association with page content. One manner of displaying the definition information is by using 'mouse-over' technology, wherein upon by hovering the pointer icon over a particular term, a definition for the term appears in a small pop-up window adjacent or in close proximity to the pointer icon. Methods for providing this effect are known in the art and are outside the scope of the present invention.

Relating to the 'Fund Information' page itself, the information presented on the page is preferably broken down into a plurality of information sections designed to enable users to easily locate the information for which they are seeking. Such sections may include: general fund information 300; header information 302; a news icon link 303; 'Quick Stats' 304; dividends and capital gains 306; fund performance 308; a performance graph 310; portfolio breakdown 312; portfolio statistics 314; sales charges and commissions 316; and minimum investments 318. Each of these information sections includes particular content elements related to the associated section. Because funds may include several types of investments including equity investments, bond investments, and money market investments, information provided for one fund may not be relevant for another. Accordingly, based upon the type of fund being displayed, some of the content elements described below may be omitted. Following each content element, a listing of the applicable fund types for which the content is displayed will be set forth in parentheses.

Referring now to the general fund information section 300, the following information is preferably included: the name of the fund (all types), the class of the fund (all types), the objective of the fund (all types), links to fund and economic commentary (all types); and the name of the manager associated with the fund (all types). Since many funds include multiple classes, the information presented on the 'Fund Information' page 206 and underlying pages is directly related to the particular class selected. Therefore, selection of an appropriate class must be made upon initial presentation of the 'Fund Information' page. In a preferred embodiment, each class listed in the general fund information section 300 comprises a hyperlink to a 'Fund Information' page having the associated content. By default, the initial class is displayed upon initial presentation of the page. Of course, it should be understood that fund class selection may be made in any suitable manner including prior to display of the 'Fund Information' page 206 or during fund selection.

Next, the header information section 302, preferably includes the following information: the fund's ticker symbol (all types); its CUSIP (Committee on Uniform Security Identification Procedure) number (all types); its transfer agent (TA) number (all types); and the fund's date of inception (all types). In the 'Quick Stats' section 304, displayed information includes, the fund's: net asset value (NAV) (all types); maximum offer price (all types); daily dividend factor (daily accrual); 52 week high/low (bond/equity funds); year-to-date percentage return (with and without sales charge) (all types); MorningStar rating (bond/equity funds); Lipper Ranking (bond/equity funds); IBC rating (money market funds); NAIC rating (money market funds); Moody Rating (money market funds); Standard & Poor's rating (money market funds); 30 day distribution yield (all types); 30 day SEC (with date) (bond/money market funds); 1 day distribution rate (money market/manual funds); 7 day distribution rate (money market funds); 7 day compounded distribution yield (money market/manual funds); One Group trading deadline (money market funds); SEI trading deadline; net asset fund & class (all types); benchmark name (all types); MorningStar Style rating (bond/equity funds); average maturity (money market/bond funds); average duration (bond funds); and average quality (bond funds). Additionally, for tax free bond funds, a link is provided to a tax equivalent yield, illustrating the equivalent yield required of a taxable investment to compare to the tax-free investment.

The news icon link 303 operates to dynamically indicate when fund news is available for user review. In one embodiment, the icon is designed to flash when news is available. When a user clicks upon the icon, the system displays a news page detailing the particular fund news.

Turning now to the dividends and capital gains section 306, information is preferably displayed for the most recent three dividend/capital gains payments, if available. Additionally, a link is provided to a dividends and capital gains history page, where users may view older data. For dividends, the following information is preferably provided for each of the last three distributions: record date; ex-date (the date on which the price drops by the amount of the dividend or capital gain (see below)); payable date; amount paid; frequency and type of dividend. For capital gains, the following information is also provided for each of the last three transactions: record date; ex-date; payable date; amount of short-term gain; amount of long-term gain; and total gain.

For the fund performance section 308, performance information is displayed for load funds, no load funds, and the benchmark against which the fund is measured. Further, this information is divided into three categories: total returns; average annualized returns; and cumulative returns. For total returns, 1 month, 3 month, and year-to-date returns are provided. For average annualized returns, inception, 1 year, 3 year, 5 year, and 10 year returns are provided (no inception for benchmark). For cumulative returns, inception, 1 year, 3 year, 5 year, and 10 year returns are provided (no inception for benchmark).

Turning to the performance graph section 310, a graph is displayed representing the growth of a sample $10,000 investment for the load/no load/benchmark fund over various periods including year-to-date, 1 year, 3 year, 5 year, and 10 year. For the portfolio breakdown section 312, the following information will be displayed for the selected fund: the fund's top 10 holdings (bond/equity/money market funds); portfolio allocation (bond/equity/money market funds); quality breakdown (bond funds); maturity breakdown (bond funds); industry breakdown(equity funds); and sector breakdown (bond funds). For the portfolio statistics section 314, displayed information includes: number of holdings (bond/equity/money market funds); expense ratio (bond/equity/money market funds); turnover ratio (bond/equity funds); beta (equity funds) (a volatility comparison of the fund to its benchmarks); average PE ratio (equity funds); standard deviation (equity funds); average weighted market cap (bond/equity/money market funds); alpha (equity funds) (the statistic determines how much of the return was due to the market and how much was due to the portfolio management); R-squared (equity funds); Sharp ratio (equity funds); tax efficiency ratio (bond/equity/money market funds); average quality (bond/money market funds); average weighted maturity (bond/money market funds); average duration (bond funds).

In section 316, information is displayed regarding the cost of various sales charges and commissions. This information preferably includes for all fund types: sales charge; distribution rate; offer price; CDSC (contingent deferral sales charge); Million+Dollar explanation text (this is a commission type); commission amount; 12b-1 trailer amount (an ongoing commission paid to brokers for retaining assets with funds); 12b-1 trailer frequency (how often the commission is paid); and 12b-1 trailer start date. For the minimum investments section 318, information is displayed including the minimum initial and subsequent investments for a regular IRA.

As mentioned briefly above, several content elements associated with the 'Fund Information' page 206 are displayed through user-selection of hyperlinks included on the page. Selection of these links results in the display of distinct content pages including related fund information. In particular, one such link results in the display of a 'Fund Performance History' page. This page preferably includes fields which enable the user to select a start date and an end date for the desired historical review. In one embodiment, the start and end date are selected through the use of a button-driven interface, wherein users simply select from a plurality of month and year buttons to select the start and end date for the historical review.

An option is also preferably provided for enabling the user to select how the historical data should be grouped (e.g., daily, monthly, quarterly, or yearly). Once the user has supplied this information, the system may display historical information for the selected period including: NAV; 30 day SEC yield (this is a yield mandated by the SEC to be calculated for all bond and money market funds); dividend; short term capital gain; long term capital gain; total capital gains; distribution rate; 1 month percentage total return; 3 month percentage total return; year-to-date percentage total return; annualized percentage total return, since inception and 1, 2, 3, 4, 5 and 10 year (with and without sales charge); and cumulative percentage total return, since inception and 3, 5 and 10 year (with and without sales charge).

Another link preferably provided on page 206 results in the display of a 'Historical Name Changes' page. Since funds may go through periodic mergers, and name changes in their history, this page lists the various names under which the fund had previously been called as well as the dates during which such names were used. 'Fund Information' page 206 also links to a 'Ratings View' page which includes a detailed listing of the current ratings and rankings for the fund. In one embodiment, rankings for all classes of the particular fund are commonly displayed. A link is also provided to a page relating to the MorningStar Style box displayed on the 'Fund Information' page 206. This Style box information page includes a more detailed description of the fund's style category.

Figure 4:
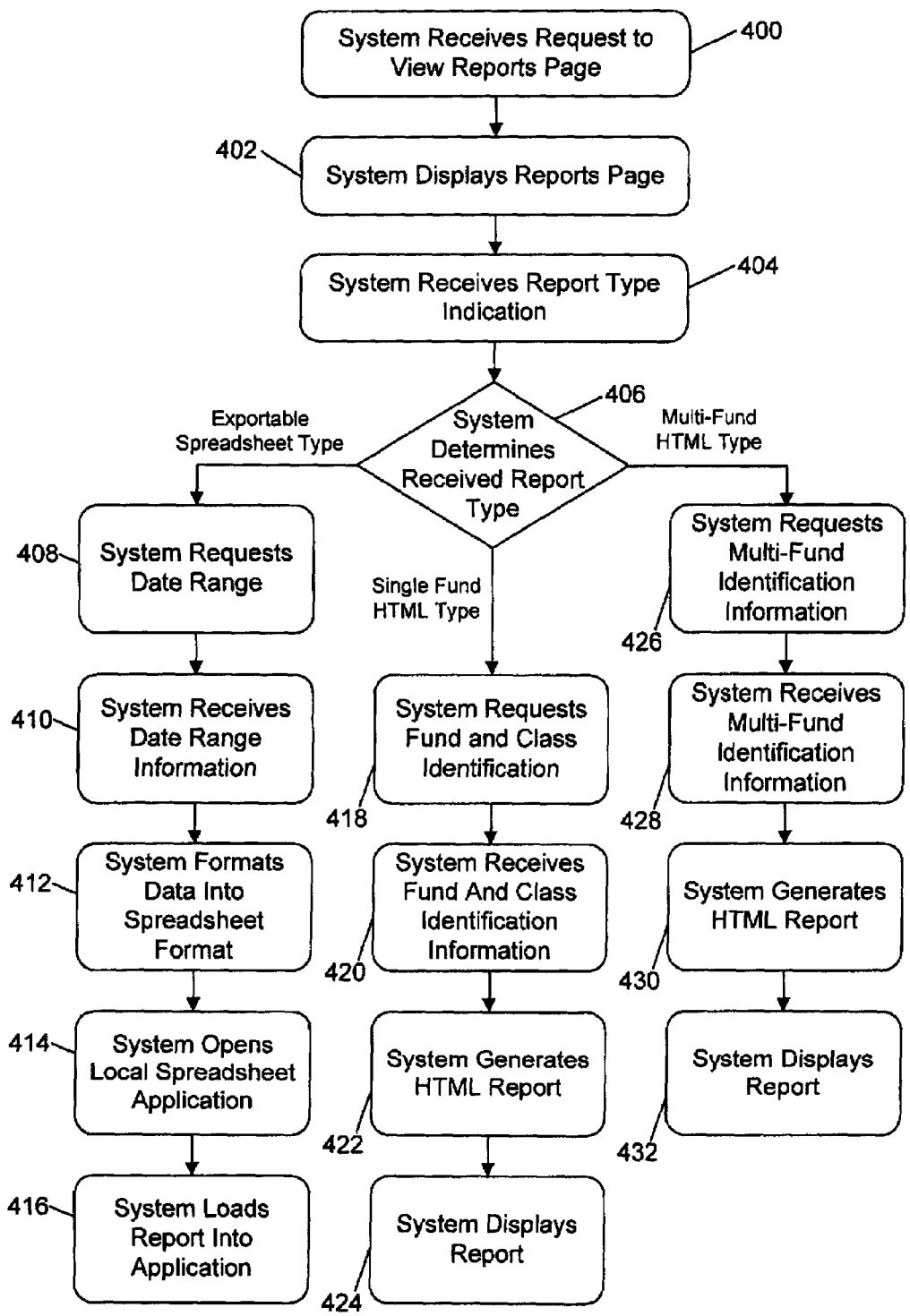
FIG. 4 is a flow chart describing one embodiment of a method for generating a specialized learning plan.

Referring now to FIG. 4, there is shown a flow chart describing one embodiment of a method for generating and displaying fund reports in accordance with the present invention. As set forth briefly above, by navigating to the 'Reports' page 216, users are able to generate and display various reports for a selected fund. In step 400, the system receives a request to view the 'Reports' page 216. In response, the system, in step 402, displays the 'Reports' page to the user including a plurality of interactive fields wherein the user may select the type and content of report they wish to create. In step 404, the system receives an indication from the user as to the type of report they want to generate. In step 406, the system determines what report type the user has requested. If the requested report type is an exportable spreadsheet report, the system, in step 408, requests a date range for the report as well as an identification of the particular fund and class for report generation. In step 410, the system receives this information from the user, and in step 412, formats the requested fund data into a spreadsheet format for exportation into a spreadsheet application such as Excel by Microsoft Corp. In step 414, the system opens a local copy of the spreadsheet application and, in step 416, loads the fund report onto the application.

If it is determined in step 406 that the user has selected a one-fund fact sheet in html form, the system, in step 418, requests an identification of a particular fund and class. In step 420, the system receives the fund and class identification from the user, and in step 422, generates an html report including fact information for the selected fund. The report is then displayed to the user in the browser interface in step 424. If it is determined in step 406 that the user has selected a multi-fund fact sheet in html form, the system, in step 426, requests an identification of the various funds for incorporation into the report. In step 428, the system receives the fund and class identifications from the user, and in step 430, generates an html report including fact information for the selected funds. The report is then displayed to the user in the browser interface in step 432. Of course, once a fund has been generated in any of steps 416, 424 and 432, the user may print the report out to a local or network printer, or save the report for later review.

Figure 5:
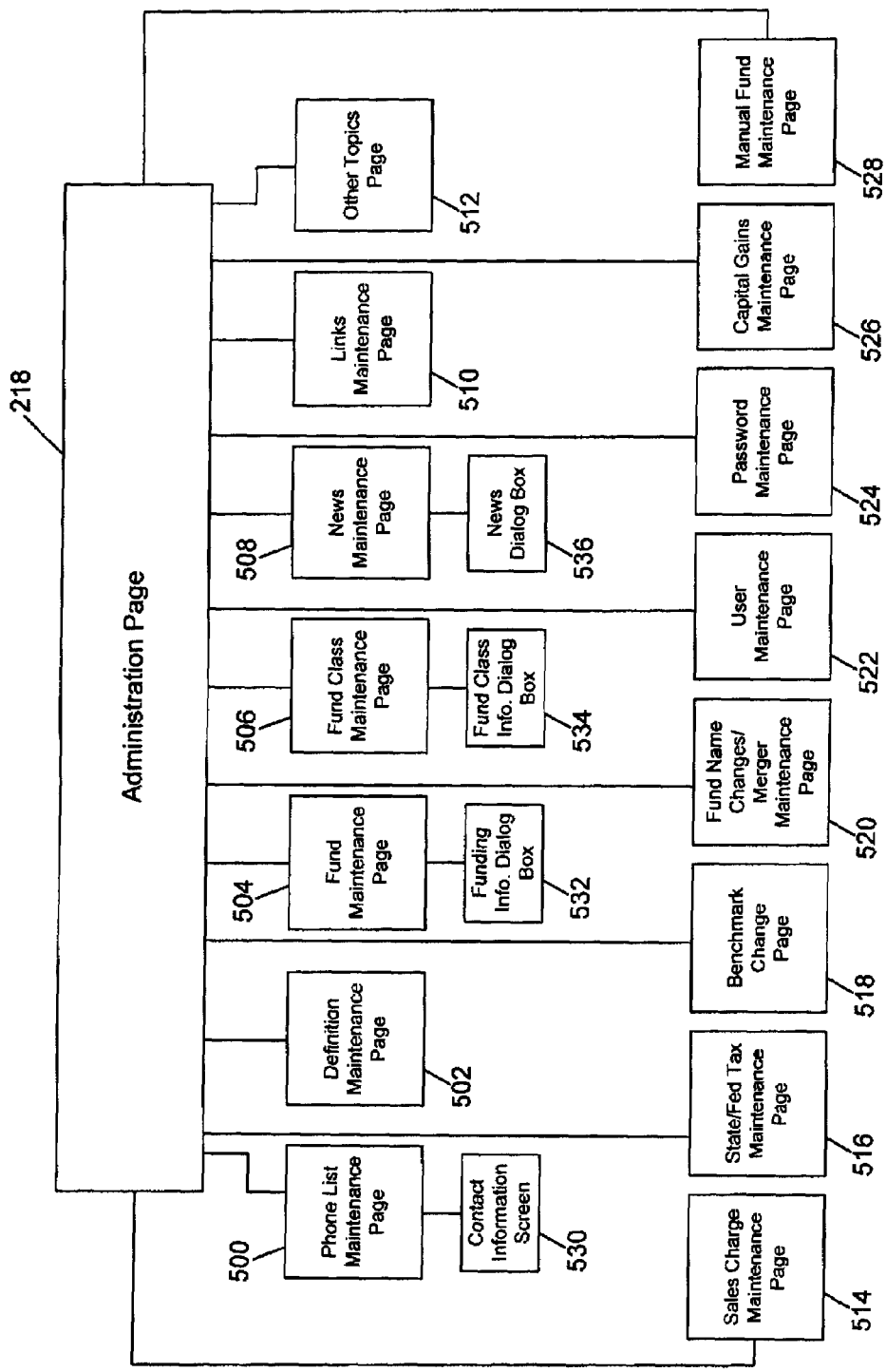
FIG. 5 is a flow chart describing one embodiment of a method for selecting content categories for users.

Referring now to FIG. 5, there is shown an organizational map of one embodiment of an administration system in accordance with the present invention. As described briefly above, the financial information system home page 202 includes a link to an 'Administration' page 218 wherein authorized administrators may modify the content and organization of the various system content elements. As shown in FIG. 5, one embodiment of the 'Administration' page 218 includes a plurality of links for directing administrators to various distinct content administration pages or, alternatively, sub-frames within an overall administration outer frame.

In particular, pages provided include a 'Phone List Maintenance' page 500, a 'Definition Maintenance' page 502, a 'Fund Maintenance' page 504, a 'Fund Class Maintenance' page 506, a 'News Maintenance' page 508, a 'Links Maintenance' page 510, an 'Other Topics' page 512, a 'Sales Charge Maintenance' page 514, a 'State/Fed Tax Maintenance' page 516; a 'Benchmark Change' page 518; a 'Fund Name Changes/Merger Maintenance' page 520; a 'User Maintenance' page 522; a 'Password Maintenance' page 524; a 'Capital Gains Maintenance' page 526, and a 'Manual Fund Maintenance' page 528. Each of these discrete pages or frames enable administrators to change content elements associated with the page. In one preferred embodiment, each individual administration page further includes a hit counter designed to track the number of times the page was accessed.

In particular, the 'Phone List Maintenance' page 500 preferably includes interactive fields whereby the administrator may enter the individual's name whose contact information they wish to change. Upon receiving a employee name, the system displays a contact information screen 530 listing the various pieces of stored contact information. The administrator may then modify or delete any incorrect information and save the new information for subsequent retrieval by system users. The 'Definition Maintenance' page 502 provides administrators with a listing of all terms having roll-over pop up definitions as mentioned above. The administrator may then modify or delete any desired definitions or add new definitions.

The 'Fund Maintenance' page 504 provide administrators with the ability to modify several pieces of fund-specific information as shown on the 'Fund Information' page 206. Initially, the 'Fund Maintenance' page 504 includes several interactive fields wherein the administrator identifies the particular fund they would like to modify or chooses to create a new fund record. Upon receipt of the fund identification information, the system retrieves the modifiable fund data and displays it in editable form in a fund information dialog box 532. The administrator may then modify any desired information in dialog box 520 and save the changes for subsequent retrieval by system users.

In particular, in one embodiment, administrators may modify the following information from within dialog box 532: the fund name; the fund short name; the fund type; Bisys fund number (related to automatic updates of fund information); the Lipper fund name; the Bisys fund name; the MorningStar fund name; the tax exempt state; the dividend frequency; the dividend type; the minimum initial and subsequent investments; the minimum and subsequent IRA investments; the fund management group name; the fund commentary link; the fund objective text; the fund inception date; the One Group trading deadline; the SEI trading deadline; the Moody's ranking; the S&P ranking; and the NAIC ranking. Of course, any additional information which may be necessary to displaying or retrieving financial information may also be modified in this manner.

The 'Fund Class Maintenance' page 506 enables administrators to modify the class of a particular fund. As with the 'Fund Information' page 206, above, an initial page 506 includes several interactive fields wherein the administrator identifies the particular fund they would like to modify. Upon receipt of the fund identification information, the system retrieves the modifiable class information and displays it in editable form in a fund class information dialog box 534. The administrator may then modify the class and save it for subsequent retrieval and display.

The 'News Maintenance' page 508 provides administrators with the ability to edit/add/remove fund news for a particular fund. Initially, the 'News Maintenance' page 508 will request and receive fund identification information from the user in a manner similar to those described above. Alternatively, the administrator may choose to edit/add/remove news from the information system home page 202. Once a selection has been made, the system displays a news dialog box 536 in which the administrator can make the desired news changes. Upon saving the changes for a particular fund, the news icon link 303 will flash upon subsequent user visitations.

Turning now to the 'Links Maintenance' page 510, the 'Sales Charge Maintenance' page 514, the 'State/Fed Tax Maintenance' page 516; the 'Benchmark Change' page 518; the 'Fund Name Changes/Merger Maintenance' page 520, the 'Capital Gains Maintenance' page 526, and the a 'Manual Fund Maintenance' page 528, each of these pages enable administrators to edit/add/remove information related to the associated page from the system in a manner similar to those described above.

The 'User Maintenance' page 522 and the 'Password Maintenance' page 524 enable administrators to administer the accounts of the various system users. On these pages, new users can be added, departed users may be removed, and passwords may be changed or made available to their respective users.

By providing a system and method for facilitating the dissemination and administration of relevant financial services information, customer service is substantially increased. In particular, the easily navigable interface and manner of quickly retrieving requested information further increased the ability of CSR's to provide customers with prompt and accurate information.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A method for providing access to support information in substantially real-time, comprising the following steps:
receiving, by a customer service representative, at least one inquiry from a customer over a communications link;
receiving, in response to the at least one inquiry, a request from a client computer associated with the customer service representative for support information relating to the at least one inquiry, the request being transmitted over a computer network;
displaying an information system home page to the client computer system, the information system home page comprising at least the following options: a fund search option and a reports option;
receiving, from the client computer, a request for a selected one of the fund search option and the reports option;
retrieving content relating to the selected one of the fund search option and the reports option from at least one information source associated with the computer network;
displaying the content relating to the selected one of the fund search option and the reports option to the client computer; and
relaying portions of the content relating to the selected one of the fund search option and the reports option to the customer in response to the inquiry, wherein if the request is for the reports option, further comprising:
receiving, from the client computer, a report type selection relating a general report format, the report type selection comprising at least one of the following: an exportable spreadsheet type, a single fund HTML type, and a multi-fund HTML type;
generating a report of at least one fund consistent with the received report type selection; and
displaying the report to the client computer over the computer network.

2. The method of claim 1, wherein the communications link is a telephone system.

3. The method of claim 1, wherein the communications link is a computer network.

4. The method of claim 1, further comprising the steps of:
receiving, from the client computer, a request for the selection of the fund search option;
receiving, from the client computer, fund identification elements for enabling retrieval of fund-specific information relating to a selected fund;
retrieving fund-specific content relating to the selected fund from the at least one information source associated with the computer network;
displaying the retrieved fund-specific content to the client computer; and
relaying portions of the fund-specific content relating to the customer over a communications link in response to the inquiry.

5. The method of claim 4, wherein the fund search option includes a text entry box for receiving user input of fund identification elements.

6. The method of claim 4, wherein the fund search option includes a drop-down menu of available funds.

7. The method of claim 4, wherein searchable fund identification elements include at least the following: fund name, CUSIP number, and fund ticker symbol.

8. The method of claim 4, wherein the step of retrieving fund-specific content relating to the selected fund from the at least one information source associated with the computer network, further comprises the step of displaying a fund information web page to the client computer.

9. The method of claim 8, wherein the fund information web page includes at least the following information: general fund information; dividend and capital gains information; fund performance information; fund portfolio breakdown information; fund portfolio statistics information; sales charges and commissions information; and minimum investments information.

10. The method of claim 8, further comprising the steps of:
displaying a fund information web page including a fund historical performance option;
receiving a selection of the fund historical performance option;

receiving a date range selection;
retrieving, from the at least one information source, historical fund information for the selected date range selection; and
displaying, to the client computer, the historical fund information for the selected date range selection.

11. The method of claim 8, further comprising the steps of:
displaying a fund information web page including a fund historical name changes option;
receiving a selection of the fund historical name changes option;
retrieving, from the at least one information source, a listing of any name changes associated with the selected fund; and
displaying, to the client computer, the listing of any name changes.

12. The method of claim 1, further comprising the steps of:
receiving, from the client computer, fund identification elements for identifying the at least one fund to be reported;
retrieving fund-specific content relating to the at least one fund from the at least one information source associated with the computer network.

13. The method of claim 12, further comprising the steps of:
receiving, from the client computer, an exportable spreadsheet report type selection;
displaying a date range request to the client computer;
receiving a date range for the generated report; and
generating a report of the at least one fund for the received date range in exportable spreadsheet format.

14. The method of claim 12, further comprising the steps of:
receiving, from the client computer, an single fund HTML report type selection;
displaying a fund and class identification request to the client computer;
receiving fund and class identification from the client computer; and
generating a report for the selected fund and class in HTML format.

15. The method of claim 12, further comprising the steps of:
receiving, from the client computer, an multi-fund HTML report type selection;
displaying a fund and class identification request to the client computer for all funds to be reported;
receiving fund and class identification from the client computer for all funds to be reported; and
generating a report for the selected funds and classes in HTML format.

16. A system for providing access to support information in substantially real-time, comprising the following steps:
an information center for receiving at least one inquiry from a customer over a communications link;
a client computer associated with a customer service representative and operatively connected to the information center, the customer service representative responsive to the at least one inquiry;
a transaction server operatively connected to the client computer over a computer network for receiving, in response to the at least one inquiry, a request from the client computer for support information relating to the at least one inquiry;
the transaction server includes means for displaying an information system home page to the client computer system, the information system home page comprising at least the following options: a fund search option and a reports option,
the transaction server includes means for receiving, from the client computer, a request for a selected one of the fund search option and the reports option;
the transaction server includes means for retrieving content relating to the selected one of the fund search option and the reports option from at least one information source associated with the computer network;
the transaction server includes means for displaying the content relating to the selected one of the fund search option and the reports option to the client computer; and
means for relaying to the customer portions of the content relating to the selected one of the fund search option and the reports option to the customer in response to the inquiry, wherein the transaction server further comprises:
means for receiving, from the client computer, a request for the selection of the reports option;
means for receiving, from the client computer, fund identification elements for identifying at least one fund to be reported;
means for receiving, from the client computer, a report type selection relating to a general report format, the report type selection comprising at least one of the following: an exportable spreadsheet type, a single fund HTML type, and a multi-fund HTML type;
means for retrieving fund-specific content relating to the at least one fund from the at least one information source associated with the computer network;
means for generating a report of the at least one fund consistent with the received report type selection; and
means for displaying the report to the client computer over the computer network.

17. The system of claim 16, wherein the communications link is a telephone system.

18. The system of claim 16, wherein the communications link is a computer network.

19. The system of claim 16, wherein the transaction server further comprises:
means for receiving, from the client computer, a request for the selection of the fund search option;
means for receiving, from the client computer, fund identification elements for enabling retrieval of fund-specific information relating to a selected fund;
means for retrieving fund-specific content relating to the selected fund from the at least one information source associated with the computer network;
means for displaying the retrieved fund-specific content to the client computer; and
means for relaying portions of the fund-specific content relating to the customer over a communications link in response to the inquiry.

20. The system of claim 19, wherein the fund search option includes a text entry box for receiving user input of fund identification elements.

21. The system of claim 19, wherein the fund search option includes a drop-down menu of available funds.

22. The system of claim 19, wherein searchable fund identification elements include at least the following: fund name, CUSIP number, and fund ticker symbol.

23. The system of claim 19, wherein the means for retrieving fund-specific content relating to the selected fund from the at least one information source associated with the computer network, further comprises means for displaying a fund information web page to the client computer.

24. The system of claim 23, wherein the fund information web page includes at least the following information: general fund information; dividend and capital gains information; fund performance information; fund portfolio breakdown information; fund portfolio statistics information; sales charges and commissions information; and minimum investments information.

25. The system of claim 23, further comprising:
   means for displaying a fund information web page including a fund historical performance option;
   means for receiving a selection of the fund historical performance option;
   means for receiving a date range selection;
   means for retrieving, from the at least one information source, historical fund information for the selected date range selection; and
   means for displaying, to the client computer, the historical fund information for the selected date range selection.

26. The system of claim 23, further comprising:
   means for displaying a fund information web page including a fund historical name changes option;
   means for receiving a selection of the fund historical name changes option;
   means for retrieving, from the at least one information source, a listing of any name changes associated with the selected fund; and
   means for displaying, to the client computer, the listing of any name changes.

27. The system of claim 16, wherein the transaction server further comprises:
   means for receiving, from the client computer, an exportable spreadsheet report type selection;
   means for displaying a date range request to the client computer;
   means for receiving a date range for the generated report; and
   means for generating a report of the at least one fund for the received date range in exportable spreadsheet format.

28. The method of claim 16, wherein the transaction server further comprises:
   means for receiving, from the client computer, a single fund HTML report type selection;
   means for displaying a fund and class identification request to the client computer;
   means for receiving fund and class identification from the client computer; and
   means for generating a report for the selected fund and class in HTML format.

29. The system of claim 16, wherein the transaction server further comprises:
   means for receiving, from the client computer, a multi-fund HTML report type selection;
   means for displaying a fund and class identification request to the client computer for all funds to be reported;
   means for receiving fund and class identification from the client computer for all funds to be reported; and
   means for generating a report for the selected funds and classes in HTML format.

\* \* \* \* \*